United States Patent
Choi et al.

(10) Patent No.: US 7,324,941 B2
(45) Date of Patent: Jan. 29, 2008

(54) METHOD AND APPARATUS FOR DISCRIMINATIVE ESTIMATION OF PARAMETERS IN MAXIMUM A POSTERIORI (MAP) SPEAKER ADAPTATION CONDITION AND VOICE RECOGNITION METHOD AND APPARATUS INCLUDING THESE

(75) Inventors: In-jeong Choi, Kyungki-do (KR); Sang-ryong Kim, Kyungki-do (KR)

(73) Assignee: Samsung Electronics Co., Ltd., Suwon-city, Kyungki-do (KR)

( * ) Notice: Subject to any disclaimer, the term of this patent is extended or adjusted under 35 U.S.C. 154(b) by 301 days.

(21) Appl. No.: 10/898,382

(22) Filed: Jul. 26, 2004

(65) Prior Publication Data

US 2005/0065793 A1    Mar. 24, 2005

(51) Int. Cl.
G10L 15/28    (2006.01)
(52) U.S. Cl. ..................... 704/255; 704/256
(58) Field of Classification Search ............... 704/255, 704/256.2, 56.1–256.8
See application file for complete search history.

(56) References Cited

U.S. PATENT DOCUMENTS

| | | | |
|---|---|---|---|
| 5,046,099 A | 9/1991 | Nishimura | |
| 5,606,644 A | 2/1997 | Chou et al. | |
| 5,664,059 A | 9/1997 | Zhao | |
| 5,675,506 A | 10/1997 | Savic | |
| 5,737,485 A | 4/1998 | Flanagan et al. | |
| 5,737,487 A | 4/1998 | Bellegarda et al. | |
| 5,737,489 A | 4/1998 | Chou et al. | |
| 5,787,394 A | 7/1998 | Bahl et al. | |
| 5,793,891 A | 8/1998 | Takahashi et al. | |
| 5,806,029 A | 9/1998 | Buhrke et al. | |
| 5,864,810 A * | 1/1999 | Digalakis et al. | 704/255 |
| 6,073,096 A * | 6/2000 | Gao et al. | 704/245 |
| 6,151,574 A * | 11/2000 | Lee et al. | 704/256 |
| 6,151,575 A | 11/2000 | Newman et al. | |
| 6,263,309 B1 * | 7/2001 | Nguyen et al. | 704/239 |
| 6,272,462 B1 * | 8/2001 | Nguyen et al. | 704/244 |
| 6,327,565 B1 * | 12/2001 | Kuhn et al. | 704/255 |
| 6,343,267 B1 | 1/2002 | Kuhn et al. | |
| 6,389,393 B1 * | 5/2002 | Gong | 704/244 |
| 6,401,063 B1 * | 6/2002 | Hebert et al. | 704/234 |
| 6,421,641 B1 * | 7/2002 | Huang et al. | 704/250 |
| 6,460,017 B1 * | 10/2002 | Bub et al. | 704/256 |
| 6,499,012 B1 * | 12/2002 | Peters et al. | 704/256.4 |

* cited by examiner

Primary Examiner—Michael N. Opsasnick
(74) Attorney, Agent, or Firm—Buchanan Ingersoll & Rooney PC

(57) ABSTRACT

A method and apparatus for discriminative estimation of parameters in a maximum a posteriori (MAP) speaker adaptation condition, and a voice recognition apparatus having the apparatus and a voice recognition method using the method are provided. The method for discriminative estimation of parameters in a maximum a posteriori (MAP) speaker adaptation condition, in which at least speaker-independent model parameters and prior density parameters, which are standards in recognizing a speaker's voice, are obtained as the result of model training after fetching training sets on a plurality of speakers from a training database, has the steps of (a) classifying adaptation data among training sets for respective speakers; (b) obtaining model parameters adapted from adaptation data on each speaker by using the initial values of the parameters; (c) searching a plurality of candidate hypotheses on each uttered sentence of training sets by using the adapted model parameters, and calculating gradients of speaker-independent model parameters by measuring the degree of errors on each training sentence; and (d) when training sets of all speakers are adapted, updating parameters, which were set at the initial stage, based on the calculated gradients.

6 Claims, 7 Drawing Sheets

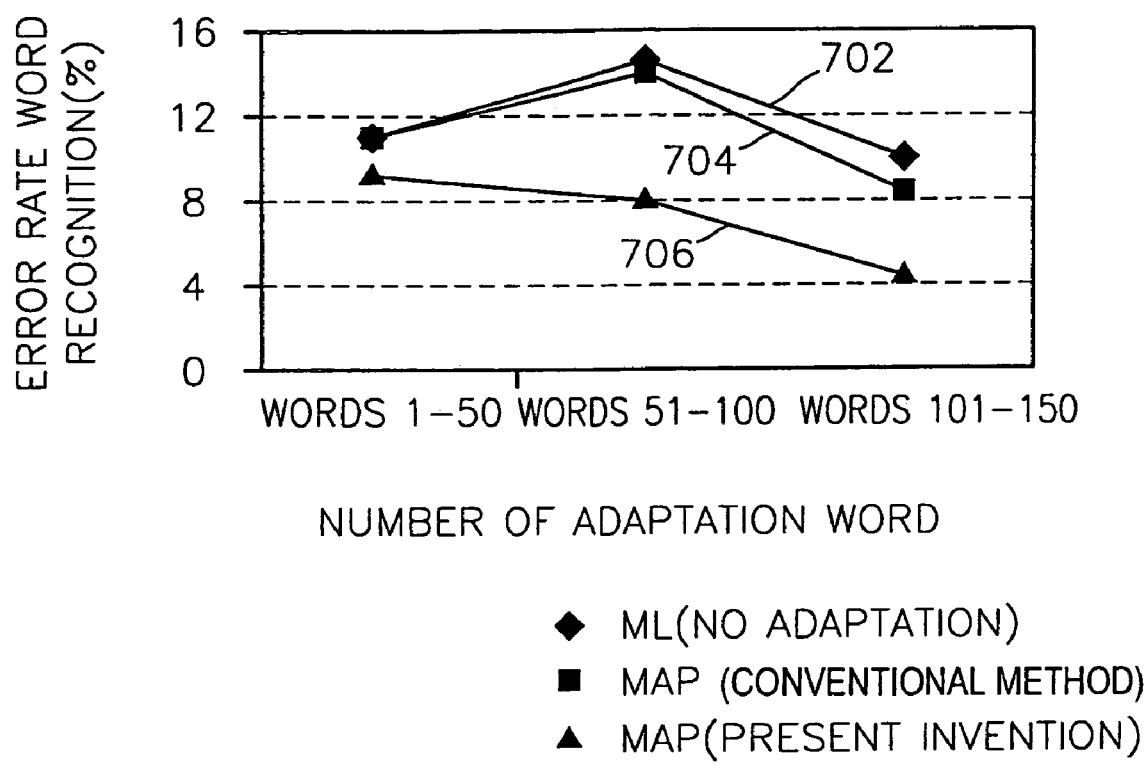

METHOD AND APPARATUS FOR DISCRIMINATIVE ESTIMATION OF PARAMETERS IN MAXIMUM A POSTERIORI (MAP) SPEAKER ADAPTATION CONDITION AND VOICE RECOGNITION METHOD AND APPARATUS INCLUDING THESE

BACKGROUND OF THE INVENTION

1. Field of the Invention

The present invention relates to voice recognition, and more particularly, to a method and an apparatus for discriminative estimation of parameters in a maximum a posteriori (MAP) speaker adaptation condition, and a voice recognition apparatus including the apparatus and a voice recognition method using the method.

2. Description of the Related Art

In MAP speaker adaptation, in order to convert a model so that it is appropriate to the voice of a new speaker, a prior density parameter which characterizes the central point of a model parameter and the change characteristic is of the parameter should be accurately estimated. Particularly in unsupervised/incremental MAP speaker adaptation, in an initial stage when less adaptation sentences are available, the performance of voice recognition can be dropped even lower than the performance thereof without a speaker adaptation function if initial prior density parameters are wrongly estimated.

In conventional speaker adaptation, the method of moments or empirical Bayes techniques are used to estimate a prior density parameter. These methods characterize statistically the variations of respective model parameters across different speakers. However, in order to estimate reliable prior density parameters using these methods, training sets on many speakers are required, and sufficient data for models of different speakers are required. In addition, since a model is converted by using the recognized result of a voice recognition in unsupervised/incremental speaker adaptation, a model is adapted to a wrong direction by incorrectly recognized results if there is no verification process.

MAP speaker adaptation is confronted with three key problems: how to define characteristics of prior distribution, how to estimate parameters of unobserved models, and how to estimate parameters of prior density. Many articles have been presented on what prior density functions to use and how to estimate parameters of the density functions. A plurality of articles have presented solutions on the estimation of parameters of unobserved models, and an invention which adapts model parameters of the speaker-independent Hidden Markov Model (HMM) has been granted a patent (U.S. Pat. No. 5,046,099).

Discriminative training methods were first applied to model training in the field of voice recognition (U.S. Pat. No. 5,606,644, U.S. Pat. No. 5,806,029), and later applied to the field of utterance verification (U.S. Pat. No. 5,675,506, U.S. Pat. No. 5,737,489).

SUMMARY OF THE INVENTION

To solve the above problems, it is an objective of the present invention to provide a method and an apparatus for discriminative estimation of parameters in a maximum a posteriori (MAP) speaker adaption condition, the method and apparatus providing reliable models and prior density parameters by updating an initial model and prior density parameters so that classification errors on training sets are minimized based on the minimum classification error criterion.

To solve the above problems, it is another objective of the present invention to provide a voice recognition method and apparatus for reducing the danger of adaptation of mistakenly recognized results, by using only verified segments, which are obtained by verifying the result of voice recognition, for parameter adaptation.

BRIEF DESCRIPTION OF THE DRAWINGS

The above objectives and advantages of the present invention will become more apparent by describing in detail a preferred embodiment thereof with reference to the attached drawings in which:

FIG. 7 illustrates the results of experimental examples comparing the method of discriminative estimation according to the present invention with conventional methods.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

In maximum a posteriori (MAP) speaker adaptation, an important issue is how reliably prior density parameters are estimated. In particular, in an incremental-mode MAP speaker adaptation, if initial set of prior density parameters are wrongly estimated, performance can drop below that of maximum likelihood (ML) estimation in an initial stage when less adaptation sentences are available.

The present invention provides more reliable model and prior density parameters for MAP speaker adaptation based on the minimum classification error training method. According to the present invention, in order to minimize the number of recognition errors in MAP speaker adaptation of a training set, model and prior density parameters are iteratively updated. In addition, according to the present invention, after measuring the reliability of recognition results so that models may not be adapted to a wrong direction due to incorrectly recognized results in an unsupervised/incremental-mode MAP speaker adaptation condition, only reliable segments are used for adapting models.

Figure 1:
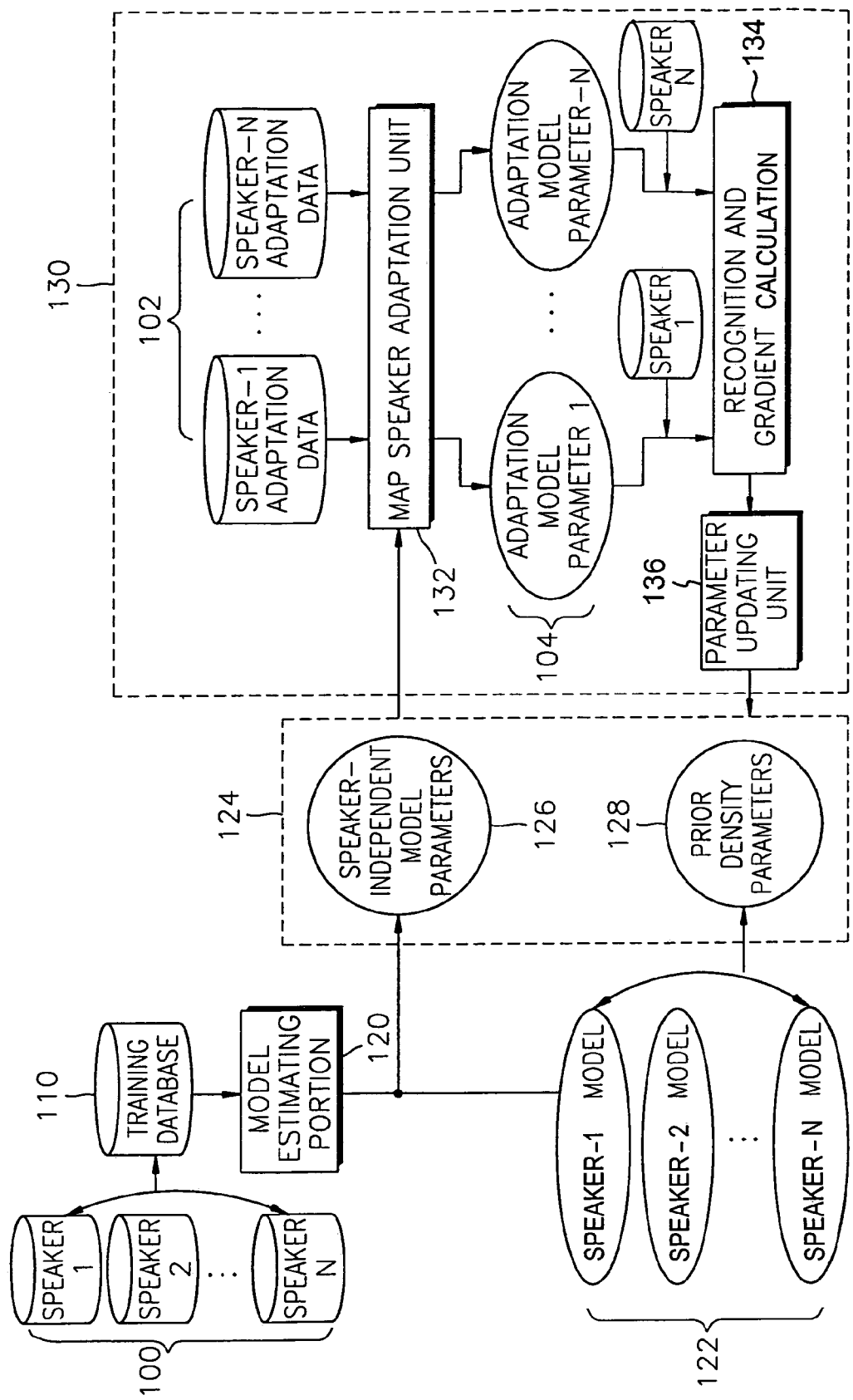
FIG. 1 is a block diagram of an apparatus for discriminative estimation of model parameters and prior density parameters in a batch-mode maximum a posteriori (MAP) speaker adaptation condition according to the present invention.
Figure 2:
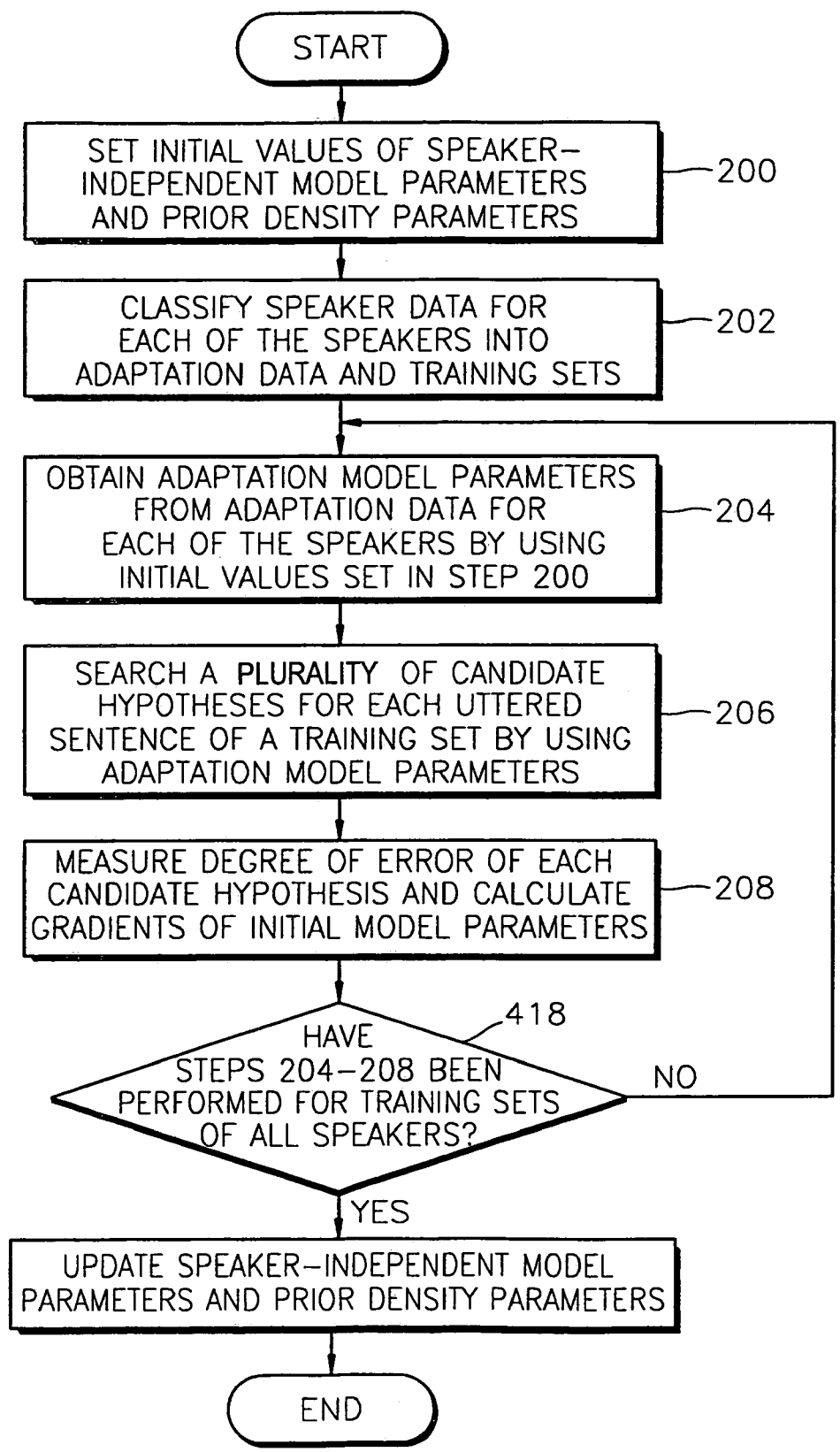
FIG. 2 illustrates a flowchart showing a discriminative estimation method according to the present invention, carried out by the apparatus of FIG. 1.

FIG. 1 is a block diagram of an apparatus 130 for discriminative estimation of model parameters and prior density parameters in a batch-mode MAP speaker adaptation according to the present invention, and the apparatus has MAP speaker adaptation unit 132, a recognition and gradient computing unit 134, and a parameter updating unit 136. FIG. 2 illustrates a flowchart showing a discriminative estimation method according to the present invention, carried out by the apparatus of FIG. 1.

Referring to FIG. 2, the operation of the apparatus of FIG. 1 will now be explained. First, initial values of speaker-independent model parameters 126 and prior density parameters are set in step 200.

A model estimating portion 120 carries out model estimating after fetching a training set on a plurality of speakers (speaker-1, speaker-2, . . . , speaker-N) 100 from a training database 110. As a result of the model estimation, speaker-dependent models (speaker-1 model, speaker-2 model, . . . , speaker-N model) 122 for respective speakers and speaker-independent model parameters 126, which are independent of speakers, are obtained. Using the method of moments, initial values of prior density parameters 128 are set from speaker-dependent models (speaker-1 model, speaker-2 model, . . . , speaker-N model) 122. Alternatively, initial values of the prior density parameters 128 are set by appropriate constant values.

Next, speech data for respective speakers are classified as adaptation data or as a training data in step 202. The training database 110 forms a training set by assembling data for each of the a plurality of speakers (speaker-1, speaker-2, speaker-N) 100, and some of training sets are used as adaptation data (speaker-1 adaptation data, speaker-2 adaptation data, . . . , speaker-N adaptation data) 102 for each of the speakers.

Next, using initial values set in the step 200, adapted model parameters are obtained from the adaptation data for each of the speakers in step 204. That is, a MAP speaker adaptation unit 132 obtains adaptation model parameters (adaptation model parameter-1, adaptation model parameter-2, . . . , adaptation model parameter-N) 104 from adaptation data for each of the speakers (speaker-1 adaptation data, speaker-2 adaptation data, . . . , speaker-N adaptation data) 102 in accordance with batch-mode MAP speaker adaption. In the batch-mode MAP speaker adaptation, after n adaptation sentences ($S^{(1)}, \ldots, S^{(n)}$) were used as adaptation data for the N-th speaker, adapted model parameters ($\lambda^{(n)}$) can be expressed as the following equation 1.

$$\lambda^{(n)} = p(\lambda^{(0)}, \theta^{(0)}, S^{(1)}, \ldots, S^{(n)}) \quad (1)$$

Here, $\lambda^{(0)}$ denotes a speaker-independent Hidden Markov Model (HMM) parameter and $\theta^{(0)}$ denotes an initial set of prior density parameters obtained by the method of moments or empirical Bayes method. Consequently, the adapted model parameters ($\lambda^{(n)}$) are obtained as the weighted sums of speaker-independent model parameters and model parameters estimated from adaptation sentences. The weights are varied with the amount of adaptation data.

Referring to FIG. 2 again, a plurality of candidate hypotheses for each uttered sentence of a training set are searched by using the adapted model parameters after the step 204.

After the degree of error of each candidate hypothesis is measured, gradients for initial model parameters are calculated in step 208.

To put it concretely, the recognition and gradient calculation unit 134 searches a plurality of candidate hypotheses for each sentence of the training set by using the adapted model sets (adaptation model parameter-1, . . . , adaptation model parameter-N) for each speaker (speaker-1, speaker-2, . . . , speaker-N). In order to measure the degree of error for each sentence, first, the distance ($d_n$) between correct hypotheses and incorrect hypotheses is obtained and then the value of a non-linear function ($e(\cdot)$) of the distance is used as an error value ($E(\lambda^{(n)})$). From the error value, the gradient ($\nabla E(\lambda^{(n)})$) of the initial parameters is calculated.

Finally, it is checked in step 210 whether or not the steps 204 through 208 have been performed for training sets of all speakers. If the steps have not been performed for training sets of all speakers, the steps are performed until the steps are performed for training sets of all speakers. When the steps are performed for training sets of all speakers, speaker-independent model parameters and prior density parameters are updated based on the calculated gradient in step 212.

To put it concretely, a parameter updating unit 136 preferably updates speaker-independent parameters 126 and prior density parameters 128 by the following equation 2.

$$\lambda^{(0)}|_{k+1} = \lambda^{(0)}|_k - \epsilon_k \nabla E(\lambda^{(adapted)})$$

$$\theta^{(0)}|_{k+1} = \theta^{(0)}|_k - \epsilon_k \nabla E(\lambda^{(adapted)}) \quad (2)$$

Here, $E(\lambda^{(adapted)}) = \Sigma_n e(d_n)$ represents the error function for the entire training sets of all speakers. $e(\cdot)$ is a non-linear function, generally a sigmoid function, for measuring the degree of error. $d_n$ represents the distance between the correct hypothesis and the incorrect hypothesis for the n-th uttered sentence, and $\epsilon_k$ represents the learning rate at the k-th iteration.

Final speaker-independent parameters and prior density parameters are estimated by iterating the above-described steps 204 through 212 until predetermined stopping conditions are met. Through the iterative estimation process, speaker-independent model parameters and prior density parameters are updated so that the number of errors in training sets is minimized.

In the batch-mode MAP speaker adaptation, adaptation data are supplied to a user in advance by a voice recognition system, and model parameters are updated in accordance with speakers. Meanwhile, in the incremental-mode MAP adaptation, adaptation is performed without using separate adaptation data when users are using the recognition system, and model parameters are incrementally updated in accordance with uttered sentences. A method and apparatus for estimating speaker-independent model parameters and initial prior density parameters by a discriminative training method in an incremental-mode MAP speaker adaptation will now be described.

In order to estimate speaker-independent model parameters and initial prior density parameters by a discriminative training method in an incremental-mode MAP speaker adaptation, first, the model-updating process, in which parameters are updated from initial parameters after each uttered sentence of a speaker is applied, must be traced. Next, the degree of error for uttered sentences are measured, and speaker-independent model parameters and initial prior density parameters are updated so that the number of errors in all uttered sentences is minimized. The operation is as follows.

Figure 3:
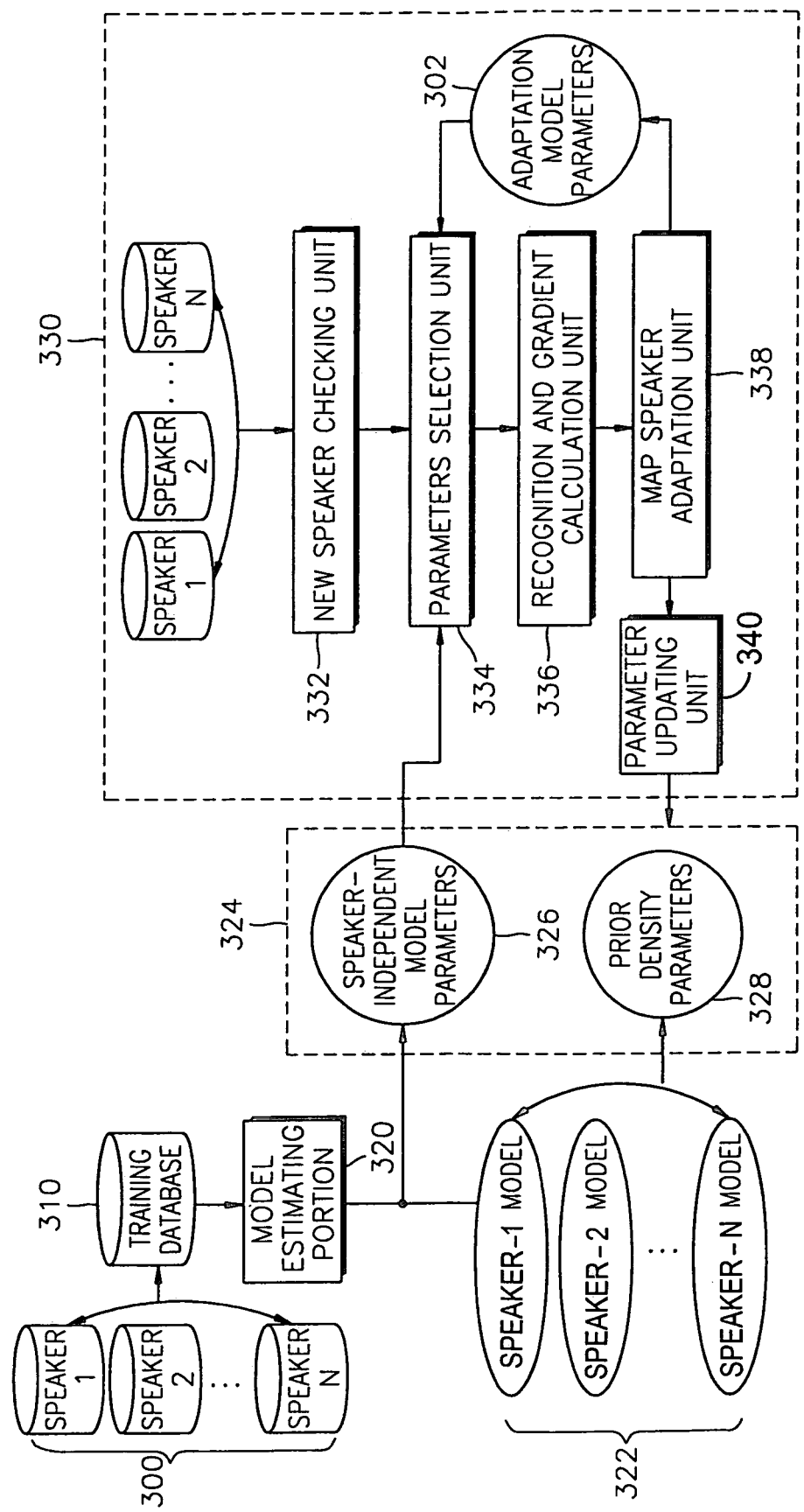
FIG. 3 is a block diagram of an apparatus for discriminative estimation of model parameters and prior density parameters in an incremental-mode MAP speaker adaptation condition according to the present invention.
Figure 4:
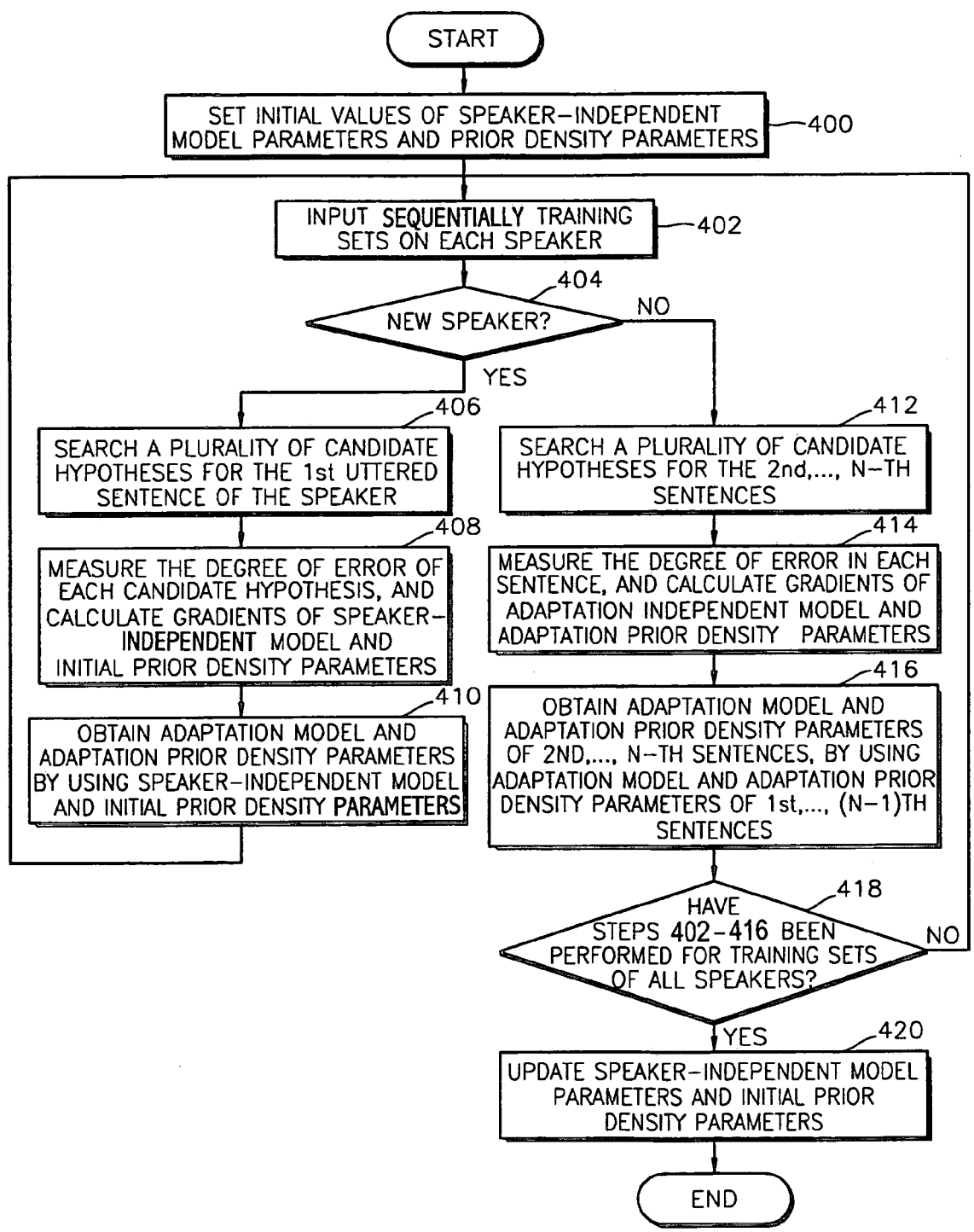
FIG. 4 illustrates a flowchart showing a discriminative estimation method according to the present invention, carried out by the apparatus of FIG. 3.

FIG. 3 is a block diagram of an apparatus for discriminative estimation of model parameters and prior density parameters in an incremental-mode MAP speaker adaptation condition according to the present invention, and the apparatus has a new speaker checking unit 332, a parameter selection unit 334, a recognition and gradient calculation unit 336, a MAP speaker adaptation unit 338, and a parameter updating unit 340. FIG. 4 illustrates a flowchart showing a discriminative estimation method according to the present invention, carried out by the apparatus of FIG. 3.

Referring to FIG. 4, the apparatus of FIG. 3 will now be described. First, initial values for speaker-independent model parameters 326 and prior density parameters 328 are set in step 400.

A model estimation portion 320 performs model training after fetching training sets on a plurality of speakers (speaker-1, speaker-2, . . . , speaker-N) from a training database 310. As a result of the model training process, models for each of the speakers (speaker-1 model, speaker-2 model, . . . , speaker-N model) and speaker-independent model parameters 326 independent of the speakers are obtained. Also, the initial values of prior density parameters 328 are set based on models for each of the speakers (speaker-1 model, speaker-2 model, . . . , speaker-N model) 322 by using the method of moments. Otherwise, the initial values of prior density parameters 328 are set with appropriate constant values.

Next, training sets on each speaker are sequentially input in step 402. Before handling input training sets on speakers, whether or not the current speaker is a new speaker is determined in step 404.

If the current speaker is a new speaker according to the result of the step 404, first, a plurality of candidate hypotheses for the $1^{st}$ uttered sentence of the speaker are searched in step 406, when a training set of a speaker is comprised of n training sets. The degree of error of each training sentence is measured and gradients of speaker-independent model parameters and initial prior density parameters, are calculated in step 408. Next, by using speaker-independent model and initial prior density parameters, adaptation model and adapted prior density parameters are obtained in step 410 and the step 402 is repeated.

Next, the $2^{nd}$ through n-th uttered sentences of the speaker are sequentially input in step 402. Since the result of the decision in the step 404 indicates the current speaker is not a new speaker, steps 412 through 416 are performed for the $2^{nd}$ through n-th uttered sentences of the speaker until a training set of a new speaker is input. For example, referring to the n-th uttered sentence, a plurality of candidate hypotheses for the n-th sentence of the speaker are searched in step 412. The degree of error of each sentence is measured and gradients of adapted model parameters and gradients of adapted prior density parameters, are calculated in step 414. Next, by using the adapted model and adapted prior density parameters of the (n−1)th sentence, the adapted model and adapted prior density parameters of the n-th sentence are obtained in step 416.

To put it concretely, the new speaker checking unit 332 of FIG. 3 receives sequentially each uttered sentence of a training set of a speaker among a plurality of speakers (speaker-1, speaker-2, . . . , speaker-N) 100, and then checks speaker change when each uttered sentence of a training set of another speaker is input. According to the information checked in the new speaker checking unit 332, the parameter selection unit 334 selects speaker-independent model parameters 326 and prior density parameters 328, both of which are set by initial values, if the information indicates a new speaker, and selects the model parameters 302 adapted through prior processing if the information does not indicate a new speaker.

The recognition and gradient calculation unit 336 searches a plurality of candidate hypotheses for each sentence of a training set by using models and prior density parameter selected in the parameter selection unit 334. Then, in order to measure the degree of error in each sentence, the distance ($d_n$) between correct hypothesis and mis-recognized hypotheses are obtained and the value of the nonlinear function (e(·)) of the distance is used as an error value ($E(\lambda^{(n)})$). The gradient of the error function of the n-th sentence on speaker-independent model parameters and initial prior density parameters can be expressed as the following equation 3.

$$\frac{\partial e(d_n)}{\partial \lambda^{(0)}} = \frac{\partial e(d_n)}{\partial d_n} \frac{\partial d_n}{\partial \lambda^{(0)}} \quad (3)$$

$$= \frac{\partial e(d_n)}{\partial d_n} \left( \frac{\partial d_n}{\partial \lambda^{(n-1)}} \frac{\partial \lambda^{(n-1)}}{\partial \lambda^{(0)}} + \frac{\partial d_n}{\partial \theta^{(n-1)}} \frac{\partial \theta^{(n-1)}}{\partial \lambda^{(0)}} \right)$$

$$\frac{\partial e(d_n)}{\partial \theta^{(0)}} = \frac{\partial e(d_n)}{\partial d_n} \frac{\partial d_n}{\partial \theta^{(0)}}$$

$$= \frac{\partial e(d_n)}{\partial d_n} \left( \frac{\partial d_n}{\partial \lambda^{(n-1)}} \frac{\partial \lambda^{(n-1)}}{\partial \theta^{(0)}} + \frac{\partial d_n}{\partial \theta^{(n-1)}} \frac{\partial \theta^{(n-1)}}{\partial \theta^{(0)}} \right)$$

The MAP speaker adaptation unit 338 preferably obtains adapted model parameters 302 from the training set of each speaker by the following equation 4 according to incremental-mode MAP speaker adaptation. In the incremental-mode MAP speaker adaptation, speaker-independent model parameters and prior density parameters after an n-th uttered sentence is processed, that is, the adapted model parameters, are updated with the speaker-independent model parameters and prior density parameters of the immediately previous stage, and the current uttered sentence statistics. After all, newly estimated parameter set is obtained from the initial parameter set and the adaptation statistics of the current uttered sentence.

$$\lambda^{(n)} = f(\lambda^{(n-1)}, \theta^{(n-1)}, S^{(n)}) = f(\lambda^{(0)}, \theta^{(0)}, S^{(1)}, \ldots, S^{(n)})$$

$$\theta^{(n)} = g(\lambda^{(n-1)}, \theta^{(n-1)}, S^{(n)}) = g(\lambda^{(0)}, \theta^{(0)}, S^{(1)}, \ldots, S^{(n)}) \quad (4)$$

Here, $\lambda^{(n)}$ and $\theta^{(n)}$ represent model parameters and prior density parameters, respectively, after an n-th uttered sentence is adapted, and $S^{(n)}$ represents an n-th uttered sentence.

It is checked in step 418 whether or not the steps 402 through 416 are performed for training sets of all speakers. When the result of checking indicates that the steps 402 through 416 have not been performed for all the training sets, the steps are performed for the all training sets, and when the steps are performed for all the training sets, the speaker-independent model parameters and prior density parameters set at initial values are updated based on the calculated gradients in step 420.

To put it concretely, the parameter updating unit 340 preferably updates speaker-independent model parameters 326 and prior density parameters 328 set at initial values by the following equation 5.

$$\lambda^{(0)}|_{k+1} = \lambda^{(0)}|_k - \epsilon_k \nabla E(\lambda, \theta)$$

$$\theta^{(0)}|_{k+1} = \theta^{(0)}|_k - \epsilon_k \nabla E(\lambda, \theta) \quad (5)$$

Here, $E(\lambda, \theta) = \Sigma_n e(d_n)$ represents a recognition error function on training sets, and e(·) represents a sigmoid function.

Final speaker-independent parameters and prior density parameters are estimated by iterating the above-described steps 402 through 420 until the predetermined stopping conditions are satisfied. Through the iterative estimation process, speaker-independent model parameters and prior density parameters are updated so that the number of errors in training sets is minimized.

So far, the method and apparatus for discriminative estimation of parameters in MAP speaker adaptation have been described. A voice recognition method and apparatus having the method and apparatus for discriminative estimation will now be described.

As described above, in MAP speaker adaptation, speaker-independent model parameters are adapted and prior density parameters are updated by using recognized results on each uttered sentence. However, since models can also change by incorrectly recognized results, models can be updated to the unwanted direction as incorrectly recognized results increase, which can cause an even worse situation. The present invention provides a voice recognition method and apparatus that solve this problem, by showing an example of an unsupervised/incremental-mode MAP speaker adaption condition.

Figure 5:
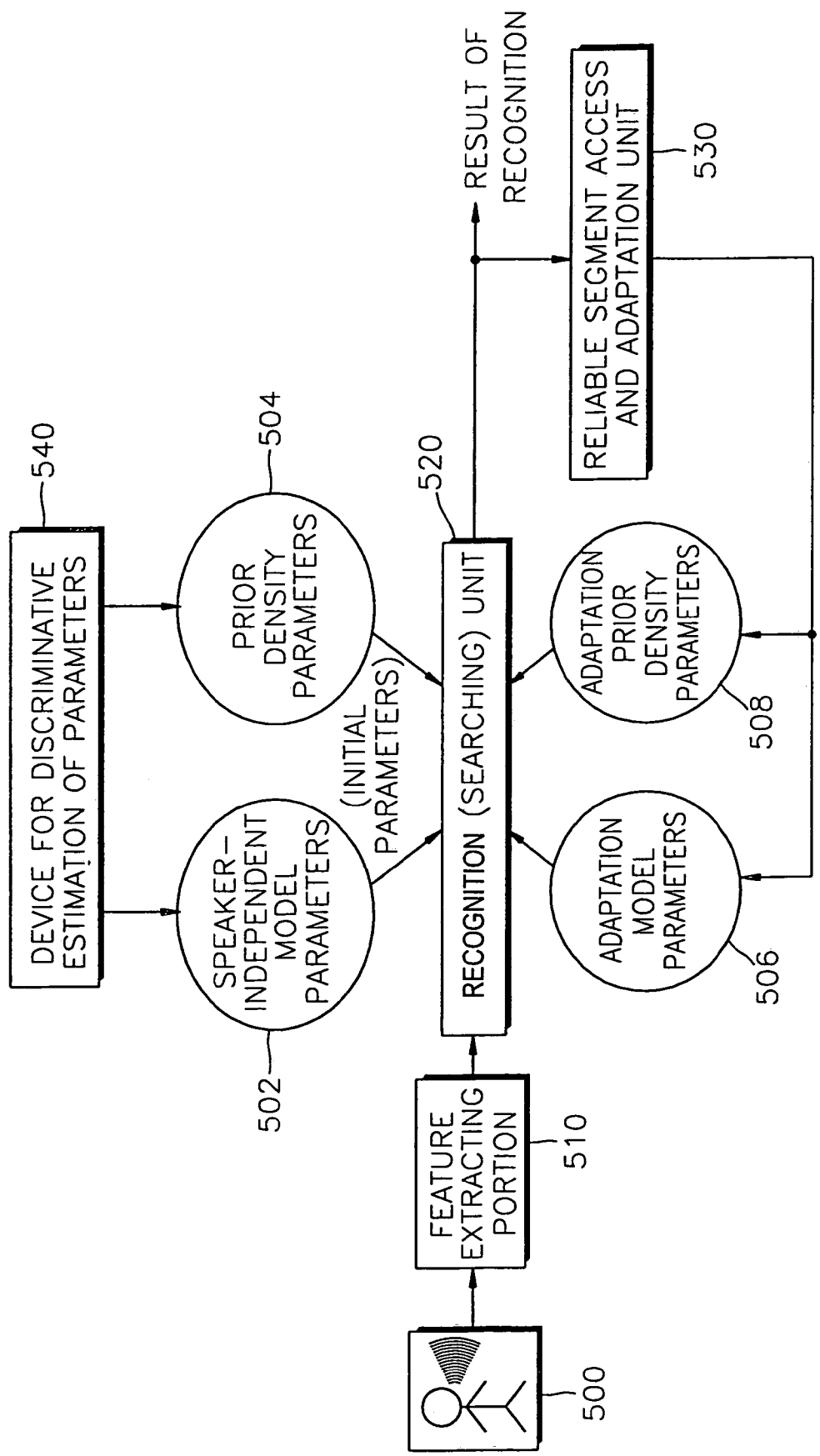
FIG. 5 is a block diagram of a voice recognition apparatus having a reliable segment verification function in an unsupervised/incremental-mode MAP speaker adaptation condition according to the present invention.
Figure 6:
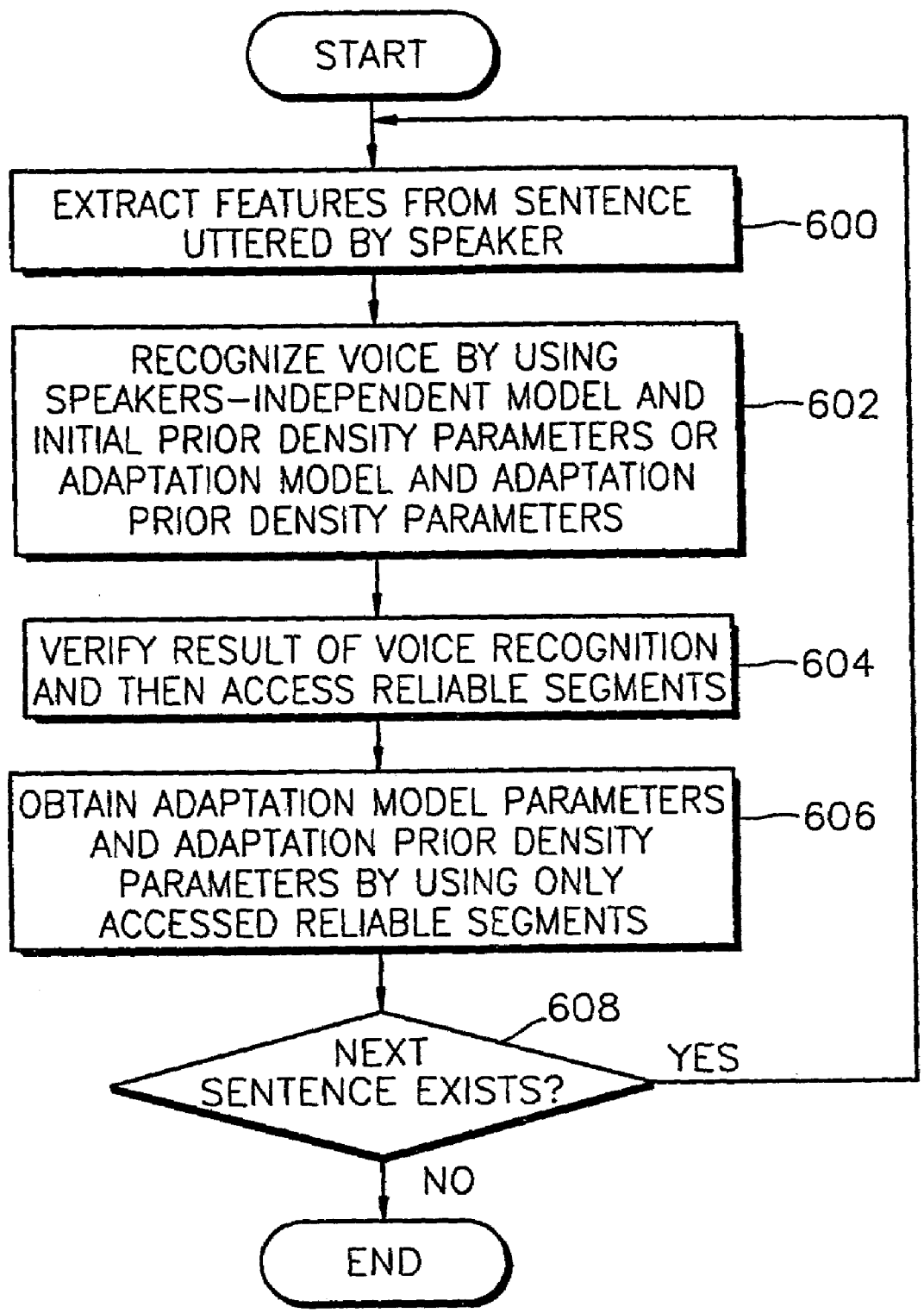
FIG. 6 illustrates a flowchart showing a voice recognition method according to the present invention, carried out by the apparatus of FIG. 5.

FIG. 5 is a block diagram of a voice recognition apparatus having a reliable segment verification function in an unsupervised/incremental-mode MAP speaker adaptation condition according to the present invention. The voice recognition apparatus is comprised of a feature extracting portion 510, a recognition (searching) unit 520, a reliable segment access and adaptation unit 530, and a device for discriminative estimation of parameters 540. FIG. 6 illustrates a flowchart showing a voice recognition method according to the present invention, carried out by the apparatus of FIG. 5.

The feature extracting portion 510 receives a sentence uttered by a speaker 500, and extracts voice features. Next, the recognition (searching) unit 520 recognizes a voice based on the extracted features by using speaker-independent model parameters 502 and prior density parameters 504 in step 602. Here, speaker-independent model parameters 502 and prior density parameters 504 are initial parameters and are the results obtained through the device for discriminative estimation 540 as described in FIGS. 1 and 3.

The reliable segment access and adaptation unit 530 verifies recognized results and accesses reliable segments in step 604. By using only accessed reliable segments, model parameters 506 and prior density parameters 508 are adapted in step 606. That is, the voice recognition method and apparatus of the present invention perform verification of words or phonemes which form recognized sentences, and apply a model adaptation stage to only verified words or phonemes.

The results of the reliable segment access and adaptation unit 530 are preferably verified by the following equation 6.

$$\frac{p(\mathbb{S}_{t1}^{t2}|\lambda^{(cand)})}{p(\mathbb{S}_{t1}^{t2}|\lambda_m)} < \tau_m \tag{6}$$

Here, $\lambda_m$ represents a recognized model, and $$\mathbb{S}_{t1}^{t2}$$

represents a voice segment from $t_1$ to $t_2$ aligned with model $\lambda_m$. $\lambda^{(cond)}$ and $\lambda_m$ represent competing models, and $\tau_m$ represents a threshold value used in determining reliability of model $\lambda_m$.

The adapted model parameters 506 and prior density parameters 508 obtained in the reliable segment access and adaptation unit 530 are fed back to the recognition (search) unit 520, and the recognition (search) unit 520 performs voice recognition using those parameters. Therefore, recognition capability can be enhanced by reducing adaptation errors, which are caused by wrongly recognized results, through the verification of reliable segments.

In order to compare the performance of the present invention with existing technologies, the following experiment was conducted by using an isolated word database built by the Electronics and Telecommunications Research Institute of Korea.

In order to establish a voice database, 40 speakers uttered 445 isolated words. Uttered data of 30 speakers were used in model training, and uttered data of the remaining 10 speakers were used in evaluation. Used models were 39 phoneme models, and each model was expressed in continuous density HMM which has three states. The feature vector used was 26 dimensions per frame, and consisted of 13-dimension perceptually linear prediction (PLP) and 13-dimension difference PLP. The probability distribution of each state is modeled in a mixture of 4 Gaussian components.

In order to evaluate the present invention, the experiment was conducted in an incremental-mode MAP speaker adaptation condition. In the incremental-mode MAP speaker adaptation condition, there are no particular adaptation data and models are adapted whenever each sentence is recognized. In supervised adaptation, adaptation was performed after what was an uttered sentence was informed, and in an unsupervised adaptation, adaptation was performed by directly using recognized results. In recognition systems in which incremental-mode MAP speaker adaptation is applied, adaptation is performed mostly in an unsupervised mode.

The overall results of the experiment are shown in table 1.

TABLE 1

| Experiment condition | Method Applied | Error rate of word recognition (%) |
|---|---|---|
| Speaker-independent (no adaptation) | ML training | 12.6 |
| | discriminative training | 6.3 |
| Conventional MAP speaker adaptation | supervised/incremental mode | 7.4 |
| | unsupervised/incremental mode | 9.4 |
| MAP speaker adaptation of the present invention (discriminative training of only prior density parameters) | supervised/incremental mode | 5.2 |
| | unsupervised/incremental mode | 6.2 |
| MAP speaker adaptation of the present invention (discriminative training of both model parameters and prior density parameters) | supervised/incremental mode | 3.5 |
| | unsupervised/incremental mode | 4.6 |

First, a speaker-independent recognition apparatus without speaker adaptation stages had a word recognition error rate of 12.6% when ML training was applied, and a word recognition error rate of 6.3% when discriminative training was applied. The apparatus of the conventional MAP speaker adaptation condition had an error rate of 7.4% in a supervised/incremental mode, and an error rate of 9.4% in unsupervised/incremental mode. When the method according to the present invention was applied, an error rate of 3.5% was recorded in the supervised/incremental mode and an error rate of 4.6% was recorded in the unsupervised/incremental mode. The figures showed performance improvement over the conventional method by more than 50%.

FIG. 7 illustrates the results of experimental examples comparing the method of discriminative estimation according to the present invention with conventional methods.

Referring to FIG. 7, when the number of adaptation words was small, the training method in the conventional MAP speaker adaptation condition showed mere performance improvement over the training method without adaptation. However, the discriminative training method in the MAP speaker adaptation method according to the present invention showed a great performance improvement in recognition even when the number of adaptation words was small.

As described above, the method and apparatus for discriminative training according to the present invention solves the problem of performance drop in a batch-mode MAP speaker adaptation condition when the amount of adaptation data is small, and the problem of performance drop in the initial adaptation stage of an incremental-mode MAP speaker adaptation condition. Also, the voice recognition method and apparatus according to the present invention adapts parameters after selecting only verified segments of recognized results in an unsupervised/incremental-mode MAP speaker adaptation condition, which can prevent wrong adaptation which is caused by adaptation using the result of wrong recognition.

What is claimed is:

1. A method for discriminative estimation of parameters in a maximum a posteriori (MAP) speaker adaptation condition, wherein at least speaker-independent model parameters and prior density parameters, which are standards in recognizing a speaker's voice, are obtained as the result of model training after fetching training sets on a plurality of speakers from a training database, the method for discriminative estimation comprising the steps of:
    (a) classifying adaptation data among training sets for respective speakers;
    (b) obtaining speaker-independent model parameters adapted from adaptation data on each speaker by using the initial values of the parameters;
    (c) searching a plurality of candidate hypotheses on each uttered sentence of training sets by using adapted speaker-independent model parameters, and calculating gradients of adapted speaker-independent model parameters by measuring the degree of errors on each candidate hypotheses;
    (d) when training sets of all speakers are adapted, updating parameters, which were set at the initial stage, based on the calculated gradients; and
    (e) using the updated parameters for voice recognition.

2. The method for discriminative estimation of parameters of claim 1, wherein the step (d) updates speaker-independent model parameters ($\lambda^{(O)}$) and prior density parameters ($\theta^{(O)}$), according to the equation:

$$\lambda^{(O)}|_{k+1} = \lambda^{(O)}|_k - \epsilon_k \nabla E(\lambda^{(adapted)})$$

$$\theta^{(O)}|_{k+1} = \theta^{(O)}|_k - \epsilon_k \nabla E(\lambda^{(adapted)})$$

wherein $E(\lambda^{(adapted)}) = \Sigma_n e(d_n)$ represents the error function for each of the training sets; $e(\cdot)$ represents a non-linear function for measuring the degree of errors; $d_n$ represents the distance between the correct hypothesis and the incorrect hypotheses for the n-th uttered sentence; and $\epsilon_k$ represents the learning rate at the k-th iteration.

3. A method for discriminative estimation of parameters in a maximum a posteriori (MAP) speaker adaptation condition, wherein at least speaker-independent model parameters and prior density parameters, which are standards in recognizing a speaker's voice, are obtained as the result of model training after fetching training sets on a plurality of speakers from a training database, the method for discriminative estimation comprising the steps of:
    (a) inputting sequentially each uttered sentence of a training set for each speaker, and determining whether or not an uttered sentence is input from a new speaker;
    (b) if the input sentence is uttered by a new speaker, searching a plurality of candidate hypotheses for the 1st uttered sentence of the speaker, measuring the degree of error of each candidate hypothesis, and calculating the gradients of the initial values of the parameters;
    (c) obtaining adapted parameters by using the parameters;
    (d) if the input sentence is not uttered by a new speaker, searching a plurality of candidate hypotheses for the 2nd through n-th uttered sentences of the corresponding speaker, measuring the degree of error of each candidate hypothesis, and calculating the gradients of adapted parameters previously obtained;
    (e) again obtaining adapted parameters by using the parameters;
    (f) updating parameters set at initial values based on the calculated gradients when uttered sentences of all speakers are checked; and
    (g) using the updated parameters for voice recognition.

4. The method for discriminative estimation of parameters of claim 3, wherein the step (f) updates speaker-independent model parameters ($\lambda^{(O)}$) and prior density parameters ($\theta^{(O)}$), according to the equation:

$$\lambda^{(O)}|_{k+1} = \lambda^{(O)}|_k - \epsilon_k \nabla E(\lambda^{(adapted)})$$

$$\theta^{(O)}|_{k+1} = \theta^{(O)}|_k - \epsilon_k \nabla E(\lambda^{(adapted)})$$

wherein $E(\lambda^{(adapted)}) = \Sigma e(d_n)$ represents the error function for the entire training sets; $e(\cdot)$ represents a non-linear function for measuring the degree of errors; $d_n$ represents the distance between the correct hypothesis and the incorrect hypothesis for the n-th uttered sentence; and $\epsilon_k$ represents the learning rate at the k-th iteration.

5. An apparatus for discriminative estimation of parameters in a maximum a posteriori (MAP) speaker adaptation condition, wherein at least speaker-independent model parameters and prior density parameters which are standards in recognizing a speaker's voice are obtained as the result of model training after fetching training sets on a plurality of speakers from a training database,
    the apparatus for discriminative estimation of parameters comprising:
        a batch-mode speaker adaptation unit for obtaining adaptation model parameters from adaptation data classified from training sets of respective speakers by using the initial values of the parameters;
        a recognition and gradient calculation unit for searching a plurality of candidate hypotheses for each uttered sentence of a training set by using the adapted model parameters, measuring error degree of each candidate hypothesis, and calculating gradients for initial values of the speaker-independent model parameters; and a parameter updating unit for updating speaker-independent model parameters and prior density parameters, both of which have initial values, based on the gradients calculated for training sets of all speakers, wherein the undated parameters are used for voice recognition.

6. An apparatus for discriminative estimation of parameters in a maximum a posteriori (MAP) speaker adaptation condition, wherein at least speaker-independent model parameters and prior density parameters, which are standards in recognizing speaker's voice, are obtained as the result of model training after fetching training sets on a plurality of speakers from a training database, the apparatus for discriminative estimation of parameters comprising:

a new speaker checking unit for receiving sequentially each uttered sentence of a training set of each speaker, and then checking whether or not the sentence input is uttered by a new speaker;

a parameter selection unit for selecting initial values of the parameters when the sentence input is uttered by a new speaker, and selecting adapted parameters previously obtained when the sentence input is not uttered by a new speaker;

a recognition and gradient calculation unit for searching a plurality of candidate hypotheses for each uttered sentence of the corresponding speaker, measuring the degree of error of each candidate hypothesis, and calculating the gradients of parameters selected in the parameter selection unit;

an incremental-mode speaker adaptation unit for obtaining again adapted parameters by using the selected parameters; and a parameter updating unit for updating parameters, which are set at initial values, based on the calculated gradients for uttered sentences of all speakers, wherein the updated parameters are used for voice recognition.

* * * * *

UNITED STATES PATENT AND TRADEMARK OFFICE
CERTIFICATE OF CORRECTION

PATENT NO. : 7,324,941 B2  Page 1 of 1
APPLICATION NO. : 10/898382
DATED : January 29, 2008
INVENTOR(S) : In-Jeong Choi et al.

It is certified that error appears in the above-identified patent and that said Letters Patent is hereby corrected as shown below:

On the title page:

Add item (30) Foreign Application Priority Data as follows: --Oct. 21, 1999  (KR) 99-45856--

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,324,941 B2 Page 1 of 1
APPLICATION NO. : 10/898382
DATED : January 29, 2008
INVENTOR(S) : In-Jeong Choi et al.

It is certified that error appears in the above-identified patent and that said Letters Patent is hereby corrected as shown below:

On the title page, item (30) add Foreign Application Priority Data as follows:
--Oct. 21, 1999 (KR)  99-45856--

Signed and Sealed this

Twenty-seventh Day of May, 2008

JON W. DUDAS
*Director of the United States Patent and Trademark Office*